(12) United States Patent
Slavin

(10) Patent No.: US 7,245,785 B2
(45) Date of Patent: *Jul. 17, 2007

(54) SUPPRESSION OF RINGING ARTIFACTS DURING IMAGE RESIZING

(75) Inventor: Keith R Slavin, Beaverton, OR (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/359,275

(22) Filed: Feb. 21, 2006

(65) Prior Publication Data

US 2006/0140505 A1 Jun. 29, 2006

Related U.S. Application Data

(63) Continuation of application No. 09/911,757, filed on Jul. 23, 2001, now Pat. No. 7,050,649.

(51) Int. Cl.
*G06K 9/40* (2006.01)
*G06K 9/32* (2006.01)
*H04N 7/12* (2006.01)
*H04N 1/40* (2006.01)

(52) U.S. Cl. .................... 382/275; 382/298

(58) Field of Classification Search ............... 382/275, 382/274, 254, 260, 261, 251, 252, 298, 299, 382/300; 348/384.1, 390.1; 358/451, 463, 358/447
See application file for complete search history.

(56) References Cited

U.S. PATENT DOCUMENTS

| | | |
|---|---|---|
| 5,471,396 A | 11/1995 | White |
| 5,495,538 A | 2/1996 | Fan |
| 5,757,975 A | 5/1998 | Eschbach et al. |
| 5,819,035 A | 10/1998 | Davaney et al. |
| 5,892,632 A | 4/1999 | Behrens et al. |
| 6,108,047 A | 8/2000 | Chen |
| 6,313,772 B1 | 11/2001 | McNeely |
| 6,317,167 B1 | 11/2001 | McNeely |
| 6,351,740 B1 | 2/2002 | Rabinowitz |
| 6,408,109 B1 | 6/2002 | Silver et al. |
| 7,050,649 B2 * | 5/2006 | Slavin .................. 382/275 |

* cited by examiner

*Primary Examiner*—Yon J. Couso
(74) *Attorney, Agent, or Firm*—Fish & Neave IP Group of Ropes & Gray LLP; Jeffrey H. Ingerman; Chia-Hao La

(57) ABSTRACT

An economical method of detecting and suppressing ringing artifacts during digital image resizing is presented. The economical method substitutes costly division calculations with cost effective comparator operations. The method also includes improved image sharpening when up-sampling an image.

14 Claims, 6 Drawing Sheets

SUPPRESSION OF RINGING ARTIFACTS DURING IMAGE RESIZING

CROSS REFERENCE TO RELATED APPLICATIONS

This is a continuation of commonly-assigned U.S. patent application Ser. No. 09/911,757, filed Jul. 23, 2001 now U.S. Pat. No. 7,050,649.

BACKGROUND OF THE INVENTION

This invention relates to image resizing. More particularly, this invention relates to image resizing in which ringing artifacts are suppressed.

An image is a stored description of a graphic picture (e.g., video, text, etc.) and is often described as a set of pixels having brightness and color values. A pixel (i.e., a picture element) is generally one spot in a grid of spots that form the image.

Resizing an image involves an alteration in the pixel representation of that image. For example, to reduce the size of an image, fewer pixels are used. To enlarge the size of an image, more pixels are used. Image resizing may also include altering pixel brightness and color values. Resizing a digital representation of an image may be accomplished using a digital filter to change the sampling density of the image. Thus, resizing and "re-sampling" can be considered the same process.

A signal can be more efficiently re-sampled in the digital domain rather than in the analog domain, which involves converting the digital representation of an image into the analog domain, filtering, and then converting back to the digital domain. An input sampling grid can be used to describe the positions of the samples or pixels. It is commonly assumed that $\{0,0\}$ is the $\{x,y\}$ coordinate of the top left pixel of an image. An increase in an x-axis value indicates a move to the right in the image, while an increase in a y-axis value indicates a move down the image. While other coordinate systems may also be valid, historically, this system follows the standard scan order of a television screen, computer monitor, or other comparable display. A particular output pixel can be generated at a certain position in the input grid. For example, position (5.37,11.04) means $37/100$ of the distance from column 5 (left) to column 6 (right) in the x-axis, and $4/100$ of the distance from row 11 (above) to row 12 (below) in the y-axis. The position is said to have an input pixel index part (i.e., an integer index less than or equal to 5.37 (e.g., 5)), and a fractional part (e.g., $37/100$) corresponding to the fraction of the distance from the integer to the next pixel index along an axis.

Re-sampling two-dimensional image data can often be simplified by performing axis-separable processing. In other words, re-sampling can occur along each axis independently of the other. If high quality re-sampling is performed along each axis, then the overall re-sampling quality after combining processing from both axes should also be of high quality. In hardware, each re-sampling implementation can be based on processing pipelines, so a separate re-sampling system can be used for each axis for better performance. In software, one subroutine may be able to serve both axes.

As is well known in the art, ringing artifacts may occur in linear filtering operations that attempt to maintain frequency response up to a finite level. Such a filter applied to an edge causes ringing near either side of the edge on the output. In both cases, ringing artifacts are visible on a filtered image as an intensity rippling. Intensity rippling is a variation in the intensity of a displayed image as a function of the distance from the feature causing the ringing. Intensity rippling is most visible around features such as impulses or transitions (i.e., steps from one level to another). Impulses can be described as a jump or spike with respect to neighboring input samples where the width of the spike is extremely narrow.

The requirements for re-sampling of text and graphics images is different than for video images. In the former case, sharp edges and the absence of ringing artifacts on transitions are important.

In contrast, for some images, the preservation of spectral content in some regions is important. For other regions, behavior closer to that of graphics and text is ideal. For example, an image may consist of single sine-wave components at each position with uniform and smooth frequency changes as a function of position (such as found in typical "zone-plate" test patterns, which are video test signals in which the spatial frequencies are a smooth function of $\{x,y\}$ position). Spectral preservation only works when re-sampling such images. In contrast, transitions between objects are not spectral in nature, and a text-like interpretation may be more appropriate.

When digitally processing an image, it is often desirable to be able to reduce the size of images without introducing artifacts in the reduced image. Artifacts are image content that visibly alter the appearance of the original image. Artifacts can be present in a variety of image types. Ideally, a pleasing image appearance should be maintained when reducing an image (i.e., decimating the pixel data), even though some artifacts may still occur.

Decimation filters are used for image reduction and are usually designed from a spectral perspective. However, filters designed spectrally require many taps that are very expensive to implement. Moreover, filters with negative coefficients are obtained, which may produce ringing artifacts on sharper transitions. As is well known in the art, better spectral re-sampling is possible when more input points are used to create each output sample. The resulting longer FIR (finite impulse response) filters, however, require more computation, which can increase costs or restrict throughput (output pixels per second generated).

It is possible to create low artifact resampled images, using only four samples of history in each axis. The cubic model is obtained from the gradients (e.g., g(0) and g(1)) of the sampled signal co-sited respectively with the inner two of the four input samples (e.g., f(−1), f(0), f(1), f(2)). The gradients are calculated from the weighted sum of neighboring input samples. Co-sited refers to two corresponding values that have the same index or are at the same position. For example, f(0) can be co-sited with g(0) (gradient g(0) is calculated using f(0) and its neighboring input samples), and similarly, f(1) can be co-sited with g(1)). The four known values (e.g., f(0), g(0), f(1), g(1)) are then used to obtain the cubic coefficients. The two inner input samples will surround the generated output sample, and the gradients each correspond to one of the two corresponding inner input samples. From the estimated gradients, a model is created which is then used to calculate the output values of the resized image at a fractional position.

Up-sampling (i.e., enlarging) images also attempts to sharpen those images in order to make up for deficiencies in the high frequency responses of up-sampling filters. When sharpening an image, maintaining zone-plate frequency response and transition quality is important. The proposed four-sample approach above may encounter difficulty in maintaining image sharpness if the four sample points provided introduce a more complex feature (e.g., the four points do not represent a single sine wave).

In view of the foregoing, it would be desirable to provide an economical approach for effectively detecting and suppressing ringing artifacts in an image resizing process.

It would also be desirable to provide improved image sharpening when up-sampling an image in an image resizing process.

SUMMARY OF THE INVENTION

It is an object of this invention to provide an economical approach for effectively detecting and suppressing ringing artifacts in an image resizing process.

It is another object of the invention to provide improved image sharpening when up-sampling an image in an image resizing process.

In accordance with this invention, an image resizer is provided that includes the following stages: stage one is gamma modification, which involves removing video gamma correction that was previously applied to an image and reapplying a new gamma. Gamma is applied to a linear luminance system as a power of the luminance value. In a gamma-corrected luminance domain (Y'), narrow black features are linear (or additive) on a white background for a gamma γ equal to about 2.5. In a linear luminance domain (Y), narrow white features are linear (or additive) on a black background for a gamma γ equal to about 1. The two domains Y and Y' are related by $Y=(Y')^\gamma$ or $Y'=(Y)^{1/\gamma}$. Although an image may already have gamma correction (Y') applied to it, decimating such an image may create undesirable effects on extreme narrow light impulses. On the other hand, removing the gamma (to work in the Y domain) may create undesirable effects on extreme narrow dark impulses. As a compromise, a γ of about 1.6 is preferably applied to the signal prior to resizing (e.g., $Y_{1.6}=(Y')^{\gamma/1.6}$), because it averages the undesirable effects of the narrow light and narrow dark features of the luminance domains.

Stage two involves filtering the inner two of four gamma-modified input signal samples. Decimation filtering is applied to the four input samples using preferably a {¼, ½, ¼} symmetric 3-tap FIR filter. Because each output value requires three input samples and there are four input samples, only the two inner samples are filtered. Decimation by factors greater than two can be accomplished by multiple passes of decimation-by-two with a final pass of decimation by two or close to two. Because a final pass may use a decimation factor between one and two, a number of selectable filter banks that range from decimation-by-one to decimation-by-two are provided in memory. If the desired filter bank is not available, the final decimation pass uses the closest available decimation filter. However, this may result in noticeable filter switching during dynamic zooming. Generally, having more selectable filter banks results in less noticeable filter switching.

Stage three involves finding the co-sited gradients. Gradients are calculated using the input samples, so stage two and stage three can be executed in parallel. The gradients are calculated using digital differentiating filters. For image reduction (i.e., down-sampling), a simple pair of differentiating filters is used for gradient estimation. For image enlargement (i.e., up-sampling), an asymmetric FIR differentiating filter is advantageously used for gradient estimation in accordance with the present invention. This filter results in better image resizing than conventional 3-tap symmetric filters often used for gradient estimation. The asymmetric FIR filter emphasizes accurate edge handling over accurate peak handling, resulting in improved zone-plate test signals and a sharper image appearance in general.

Stage four involves calculating the cubic polynomial coefficients using the two inner input samples from stage two and the two co-sited gradients calculated in stage three.

Stage five involves calculating the re-sampled output sample value. A piece-wise cubic model is preferably generated to obtain a piece-wise continuous model of the output signal. The model is then evaluated at the desired fractional position to obtain a re-sampled value.

Stage six involves gamma modification to reapply gamma correction. The compromise gamma correction applied in stage one is removed and the initial gamma correction is reapplied to produce the resulting resized image. The initial gamma needs to be re-applied in order to display the resulting image correctly on a non-linear device, such as a monitor. Reapplying the original gamma correction to the resized image means that the system does not change the presentation of flat regions in an image (static component), but affects the position of edges (dynamic component) so that narrow light and dark regions are both preserved from the gamma correction applied in stage one.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

The present invention provides economical methods of image resizing that includes detection and suppression of ringing artifacts, image down-sampling when ringing artifacts are not detected, and determining whether an image should be emphasized or unemphasized when up-sampling.

Figure 1:
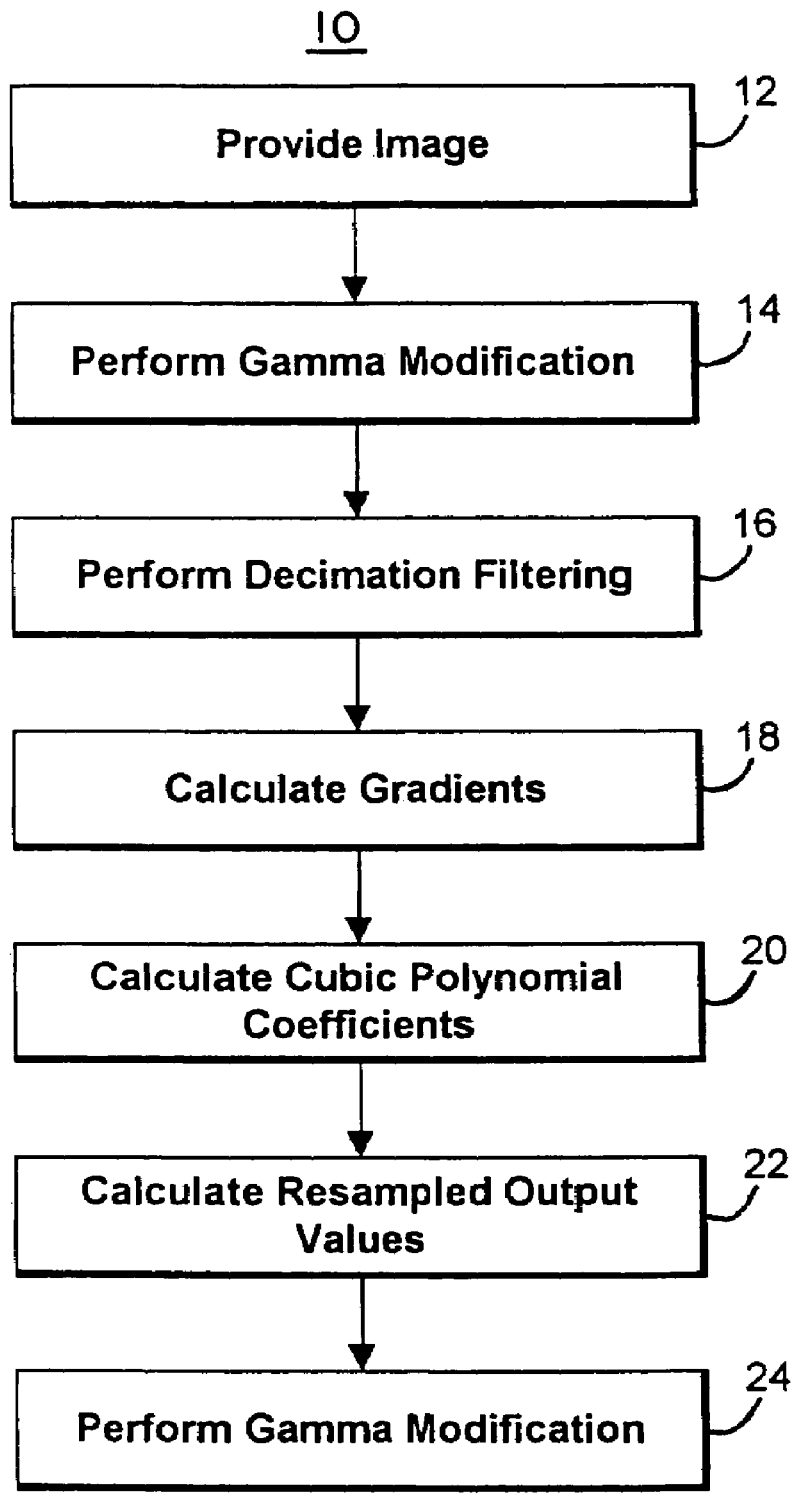
FIG. 1 is a flow chart of an exemplary embodiment of a resizer algorithm according to the present invention.

FIG. 1 illustrates a compact image resizer algorithm 10 in accordance with the present invention. Algorithm 10 begins at step 12 with an image. At step 14, gamma modification occurs. Gamma modification includes removing any existing video gamma correction and applying a new selectable gamma as now described.

Image resizing involves a linear process (e.g., re-sampling and filtering are both linear) in which signals or samples add linearly. A goal of re-sampling and filtering is to preserve the luminance of an image when decimating. Because re-sampling and filtering are both linear, they impose linearity on the re-sampled transitions after each decimation pass. Two domains need to be considered: the gamma-corrected luminance (or Y') domain and the linear luminance (or Y) domain. Linear luminance, or linear intensity, is related to the human perception of additive light on a dark background (e.g., the human eye is unable to distinguish between two white spots that are close together with similar resolutions against a black background; the eye discerns the two white spots as one white spot with additive lightness). The Y' domain gives good linearity for fine black detail since darkness is additive in the Y' domain (e.g., two black spots that are close together with similar resolutions against a white background are discerned as one spot with additive darkness).

The gamma of the input signal may differ from the gamma that produces optimal results. In that case, the input signal gamma is removed and a preferred processing gamma is applied. Powers of 1/1.6, 1.6, and 2.5 are preferred values for gamma. In particular, a gamma of about 1.6 is recommended for the optimal handling of both narrow light and narrow dark features. Once the resampled output sample values have been calculated, the corresponding reciprocal powers are preferred for gamma re-application.

After gamma modification, decimation filtering occurs at step 16. At this stage, a {¼, ½, ¼} symmetric 3-tap FIR filter is preferably used to filter the image.

The filter tap symmetry and its asymmetric response around an angular frequency of $\pi/2$ produce reasonably good results when decimating by two. Furthermore, the 3-tap coefficients {¼, ½, ¼} are economical to implement in hardware and software because the coefficients are powers of two.

A {¼, ½, ¼} symmetric 3-tap filter is preferably applied to a four-input sample window, generating two output samples co-sited with the inner two input samples. Each of the output samples relates to a corresponding inner input sample. With only four input samples, additional output samples cannot be used in later calculations without introducing undesirable artifacts. Decimation by factors greater than two includes one or more passes of decimation-by-two, followed by a final pass of decimation by less than two. Decimating by more than two in one pass may result in undesirable features such as narrow pass-bands, steep transition bands, or inadequate filter performance because of the few taps. In a final decimation pass, varying response curves may result, causing noticeable filter switching when dynamically changing resizing ratios (i.e., dynamic resizing). To prevent filter switching from becoming too noticeable, multiple selectable pre-specified filter banks are preferably available for the final decimation pass. To obtain substantially imperceptible switching over the final decimation pass, nine different filters are preferably provided (i.e., decimation-by-two, decimation-by-one, and seven intermediate blends). This represents a compromise between noticeable filter switching and the amount of hardware needed to store banks of pre-specified filters. The unblended decimation-by-two anti-aliasing filter has the following response:

$$A[\omega]=(1+\cos(\omega))/2 \qquad (1)$$

where $\omega$ is the angular frequency and $A[\omega]$ is the frequency response.

Figure 2:
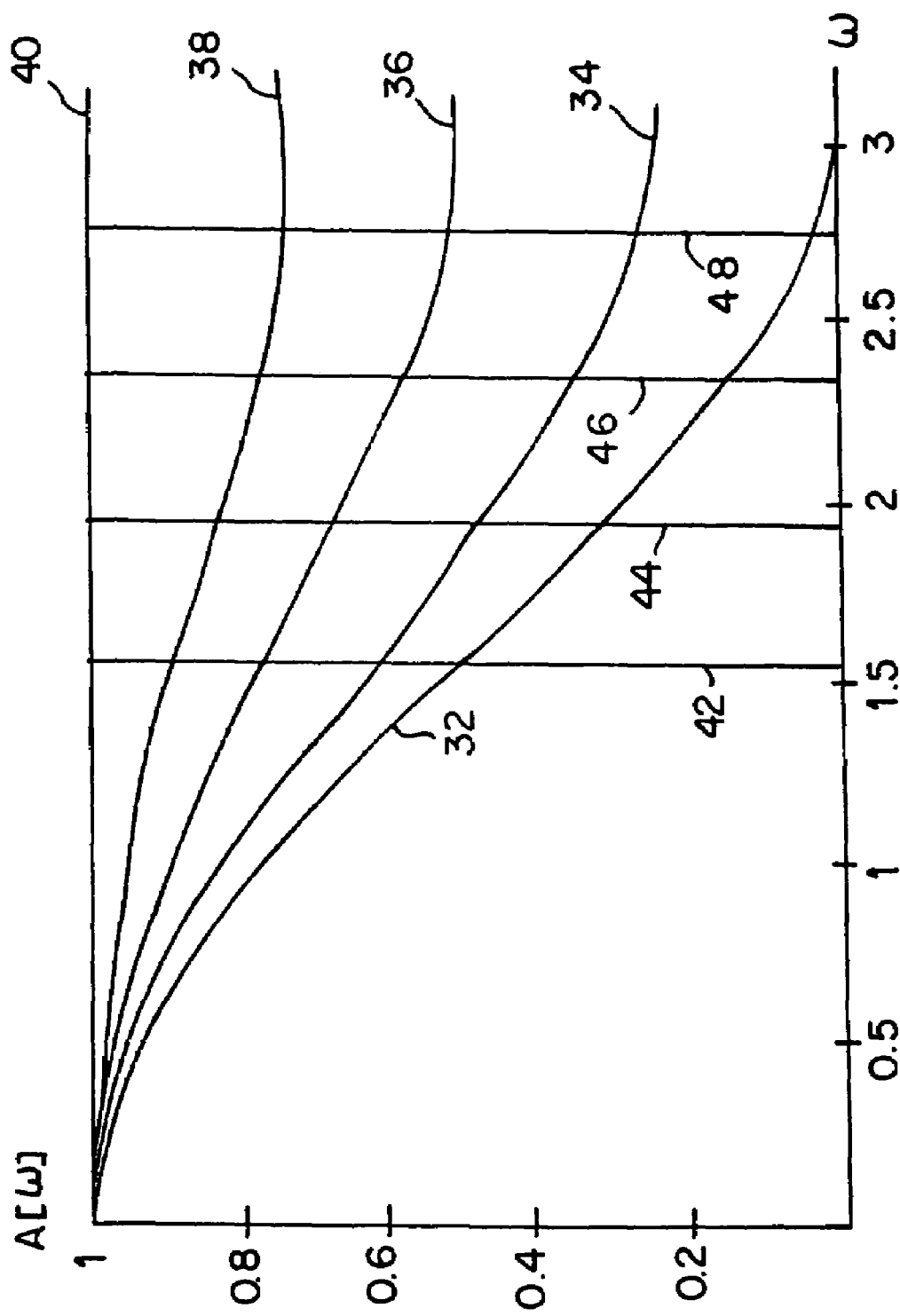
FIG. 2 is an illustration of blended anti-alias filter response curves according to the present invention.

FIG. 2 illustrates {¼, ½, ¼} filter response curves blended with the {0, 1, 0} all pass filter anti-alias filter response curves from decimation-by-two to decimation-by-one (i.e., no decimation), with corresponding ideal anti-alias cutoffs. The x-axis represents the angular frequency and the y-axis represents the frequency response. Curve 32 shows an unblended decimation-by-two filter response. Curves 34, 36, and 38 are three intermediate blended curves with decimation factors between one and two. Curve 34 has a decimation factor less than two and has a larger decimation factor than curve 36, which has a larger decimation factor than curve 38. Horizontal line 40 represents the all-pass case for no decimation. Also shown are corresponding ideal, but unrealizable, anti-alias responses with vertical cutoff transitions 42, 44, 46, and 48. Moving from left to right, cutoff transition 42 corresponds to the decimation-by-two response. Intermediate cutoff transitions 44, 46, and 48 correspond to the intermediate blends. For the all-pass case, there is no cutoff frequency. When the angular frequency is $\pi$, the cutoff no longer exists. The selection of filter blending on each resizer pass may be implemented using software.

Blending the {¼, ½, ¼} with the {0, 1, 0} filter is a reasonable compromise between cost and image quality. Compared to the ideal responses, the filter blending curves may introduce some blurring and aliasing artifacts for decimation ratios between one and two. Because blending occurs mainly in the final decimation pass, its impact on the resulting image can be reduced. Other decimation filters may produce better spectral results, but with more hardware.

Step 18 of algorithm 10 involves gradient calculations. To generate accurate piece-wise cubic models, gradients co-sited with the original sample values are needed. The 3-tap filter used for decimation processing outputs two samples, which are insufficient to obtain reliably accurate gradients at high frequencies. As a result, gradients are calculated directly from the input data. Because the gradient calculations are not dependent on any output data from decimation filtering, the gradient calculations at step 18 may be performed simultaneously with the decimation filtering at step 16.

Figure 3:
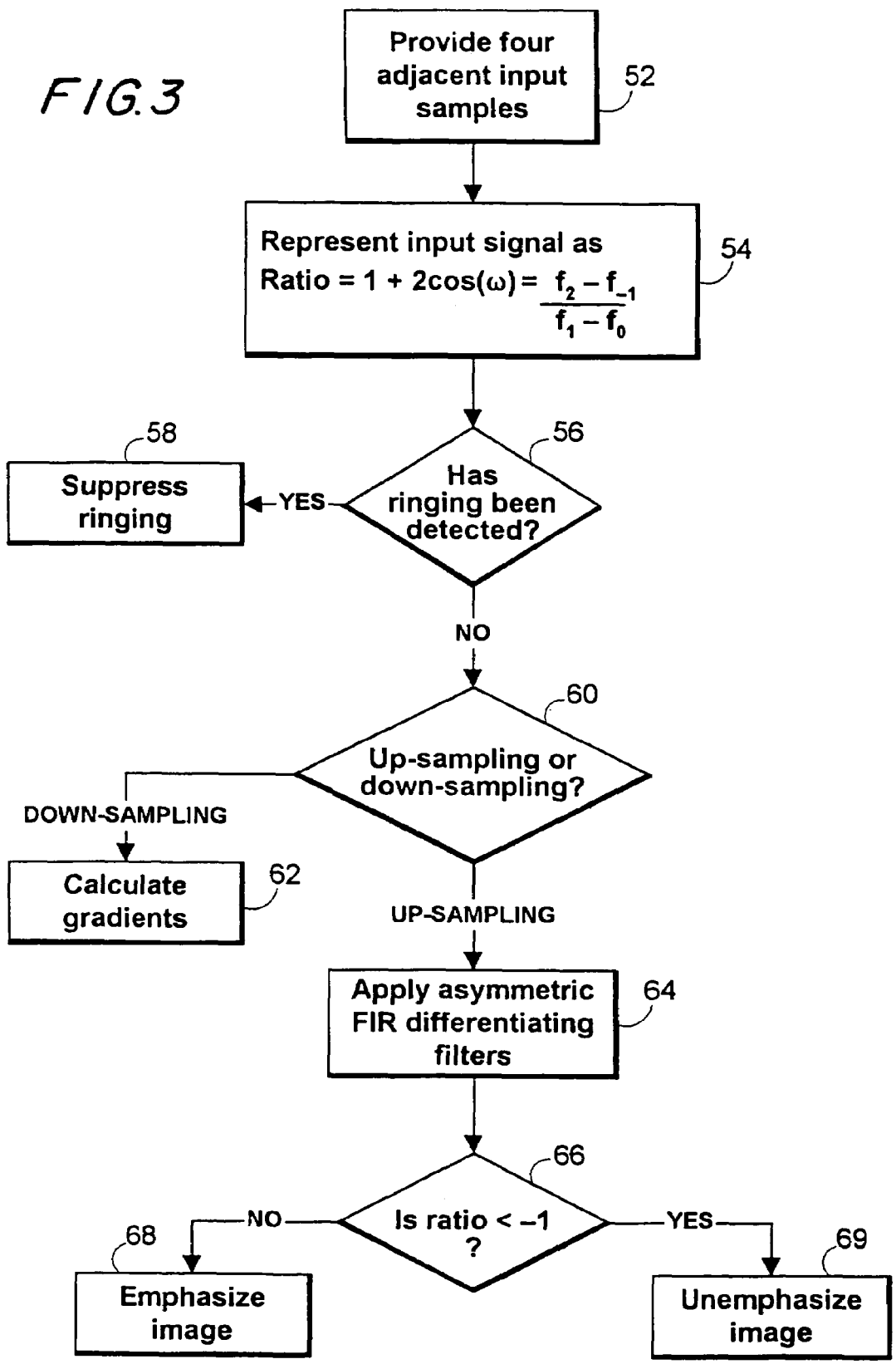
FIG. 3 is a flow chart of an exemplary embodiment of the gradient calculations of FIG. 1 according to the present invention.

FIG. 3 illustrates an exemplary embodiment of gradient calculations performed at step 18. Process 50 begins at step 52 with four adjacent input samples, which are sufficient to represent a single sine wave of angular frequency $\omega$. At step 54, the signal can be represented as follows:

$$\text{ratio}=1+2\cos(\omega)=(f_2-f_{-1})/(f_1-f_0), \qquad (2)$$

where $f_{-1}$, $f_0$, $f_1$, and $f_2$ represent the four adjacent input samples. The presence of ringing artifacts is determined at step 56 by examining the ratio in equation (2). Because the range of $\cos(\omega)$ is limited to values between −1 and +1, the ratio ideally ranges from −1 to +3. A ratio that exceeds +3 or that equals zero indicates the presence of visible ringing artifacts.

In accordance with the present invention, however, no division in equation (2) is required to determine whether ringing artifacts are present. Performing division can be costly to implement. Instead, the ratio in equation (2) can be examined for a fixed $\omega$ by first multiplying through the denominator $(f_1-f_0)$ and then by making cost effective comparisons.

Figure 4:
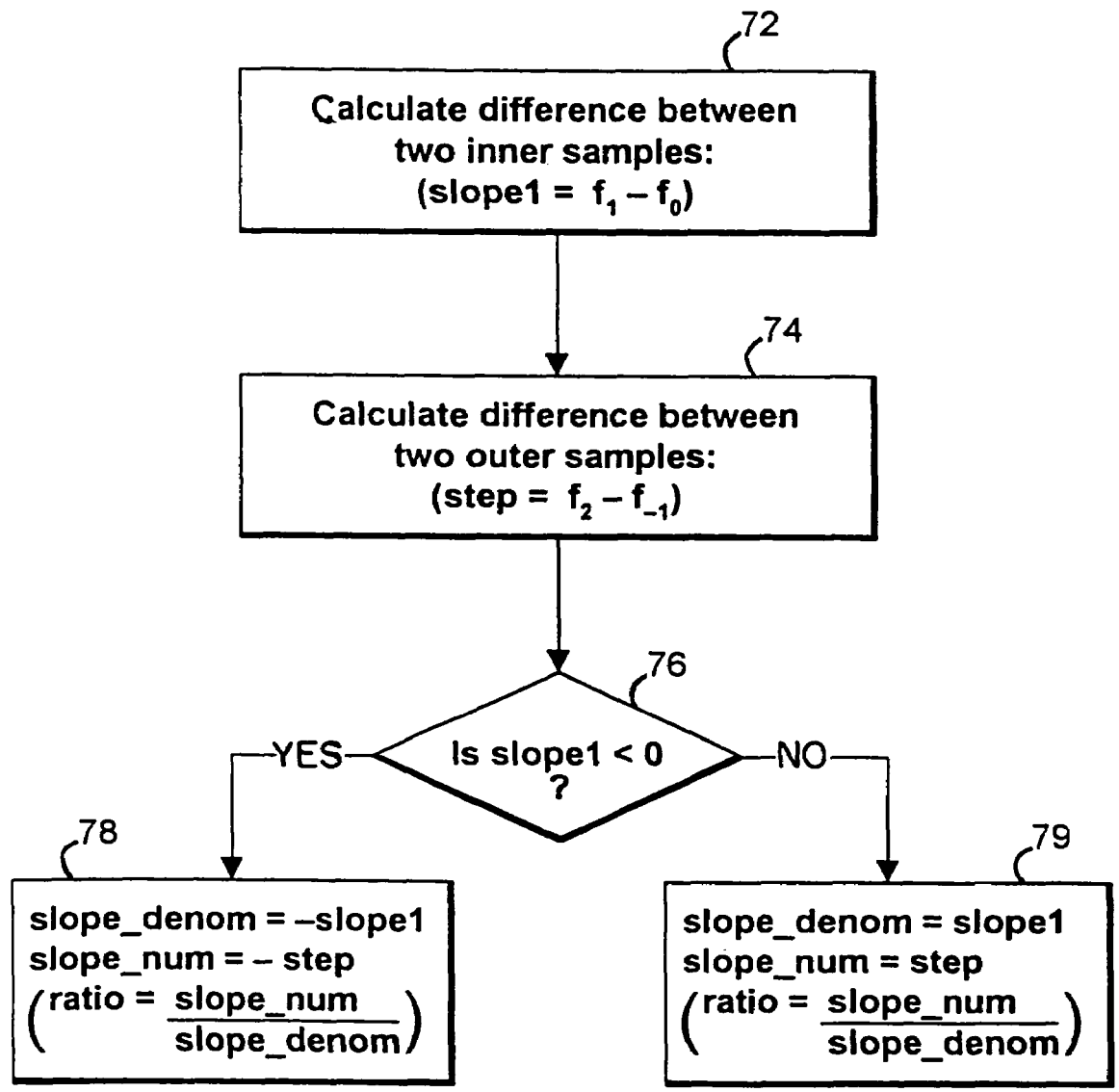
FIG. 4 is a flow chart of an exemplary embodiment of a ratio calculation based on input signal samples according to the present invention.

FIG. 4 illustrates an exemplary embodiment of the ratio calculation performed at step 54 of FIG. 3. Initially, at step 72, the difference between the two inner adjacent input samples is calculated (slope1=f1−f0). Similarly, at step 74, the difference between the two outer input samples is calculated (step=f2−f-1). Once these two values (slope1 and step) have been calculated, a test is performed at step 76 to determine if the value of slope1 is less than the value of zero. If slope1 is less than zero, the ratio is normalized at step 78. Normalization is performed by multiplying both the denominator and nimierator of equation (2) (slope1 and step, respectively) by negative one (slope_denom=(−1)*slope1 and slope_num=(−1)*step). If slope1 is not less than zero, then slope1 and step are assigned the values of the denominator and numerator (slope_denom=slope1 and slope_num=step), respectively, at step 79.

Note that when slope1 is equal to zero (i.e., $f_1=f_0$), the ratio results in an undirected infinity. This is common in text images where adjacent values are identical. When this occurs, a unique single sine-wave frequency cannot be found that goes through the four points $f_2$, $f_1$, $f_0$, and $f_{-1}$. Although $f_1$ equaling $f_0$ can occasionally occur in a single sine wave, this case is interpreted as requiring ringing suppression. Ringing suppression, using linear interpolation, will join $f_1$ to $f_0$ with a flat line. Thus, an undirected infinity, which may or may not cause minor ringing artifacts, will result in suppression.

Figure 5:
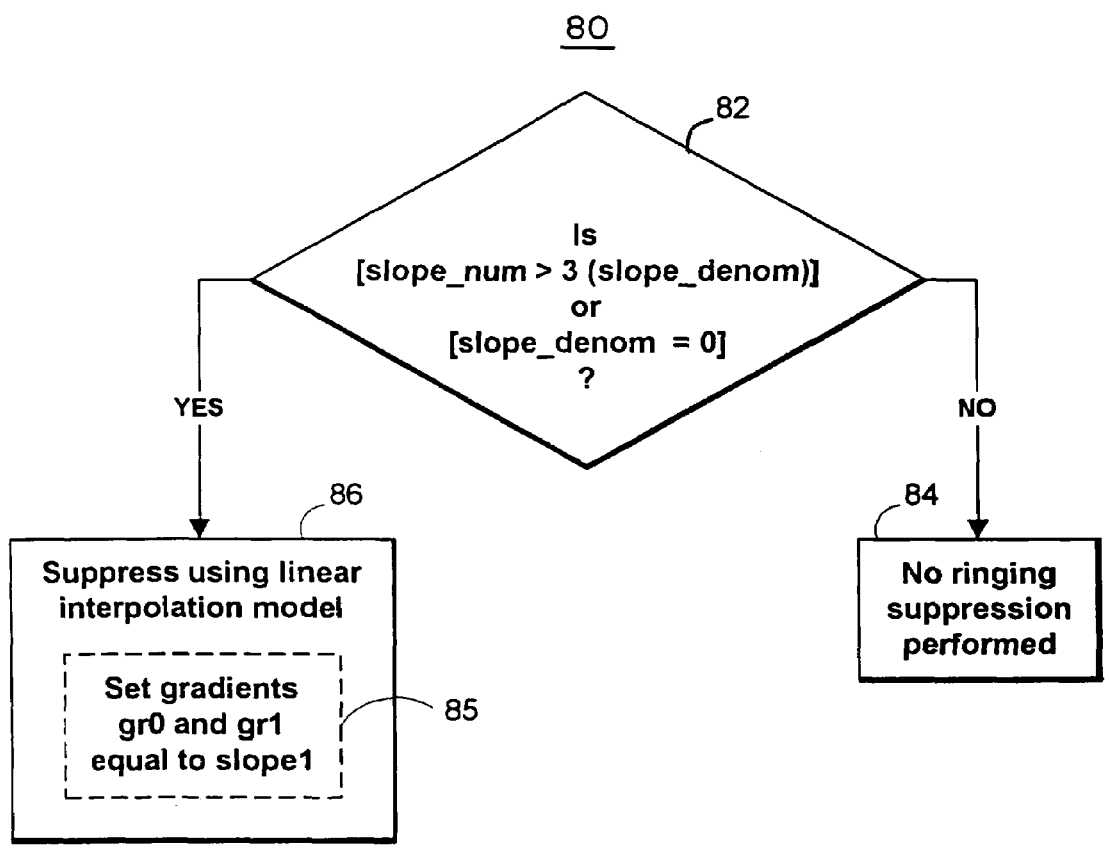
FIG. 5 is a flow chart of an exemplary embodiment of detecting and suppressing ringing artifacts according to the present invention.

FIG. 5 illustrates an exemplary embodiment of detecting and suppressing ringing artifacts as performed at steps 56 and 58, respectively, of FIG. 3. To determine whether ringing artifacts exist, the two conditions for ringing are tested at step 82. The first condition is whether the ratio of the input signal exceeds a value of positive three (slope_num>3*slope_denom), which indicates that no real value of ω is possible. This situation may occur as a result of adjacent sharp edges in an image. The second condition is whether the ratio of the input signals results in an undirected infinity (slope_denom=0), as described above.

If either condition at step 82 exists, ringing is substantially suppressed at step 86 using a linear interpolation model. This is accomplished, at step 85, by setting the two gradient values (gr0 and gr1) equal to slope1, which is the difference between the inner input samples. The gradients are set to the inner slope because wayward samples further out may contribute to ringing if they are involved in the gradient calculations (step 18 of FIG. 1).

If neither of the two conditions tested at step 82 exist, process 80 ends at step 84 where no ringing suppression is performed.

A condition may also exist where equation (2) equals exactly three (e.g., a linear ramp). This value falls just outside the scope of the conditions-defined above for ringing. However, a model (described below) fit to the four samples using a differentiating filter results in the same gradient values indicated for suppression of ringing in the two conditions above. This shows that the algorithm for detecting and suppressing ringing has continuity around the decision threshold, thus allowing for noise.

Referring to FIG. 3, if ringing is not detected, process 50 continues to step 60 to determine whether down-sampling (i.e., reducing the image size) or up-sampling (i.e., enlarging the image size) is being performed. If down-sampling, a simple pair of differentiating filters is used at step 62 to estimate gradients. This allows edges to be enhanced. Gradients are calculated as follows:

$$gr0=(f_1-f_{-1})/2$$

$$gr1=(f_2-f_0)/2 \quad (3)$$

The angular frequency response of the simple pair of differentiating filters is $G[\omega]=\sin(\omega)$, which roughly matches the ideal differentiator convolved with the filter response of the anti-aliasing filter from equation (1). The ideal differentiating response is represented by:

$$D[\omega]=[\omega(1+\cos(\omega))]/2 \quad (4)$$

Figure 6:
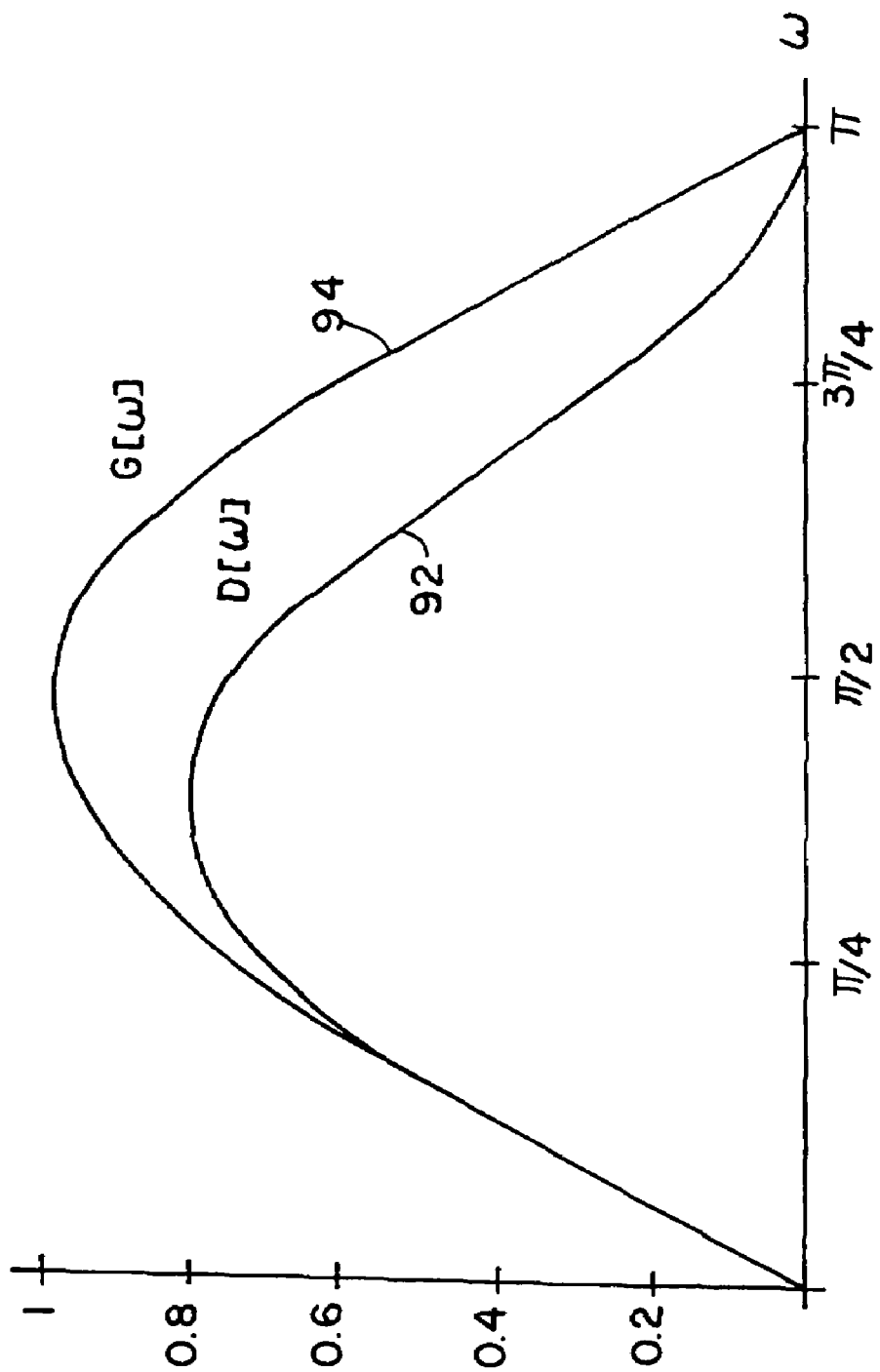
FIG. 6 is an illustration of differentiating filter response curves according to the present invention.

FIG. 6 illustrates a pair of differentiating filter response curves. Curve 92 shows the ideal differentiating response represented by equation (4). Curve 94 shows the actual differentiating filter response used for gradient estimation. The actual response is close to the ideal response for angular frequencies below $\pi/4$. At higher angular frequencies, the discrepancy in the two curves results in some artifacts. Because the filters do not cut off all frequencies above $\pi/2$, aliasing may still occur although it is advantageously significantly reduced.

When down-sampling, prior artificial model sharpening of any kind may increase visible aliasing artifacts. Artificial model sharpening increases spectral energy which may alias back into the passband when down-sampling. Thus, since sharpening occurs naturally from down-sampling, providing artificial sharpening when down-sampling is unnecessary.

Up-sampling attempts to sharpen images without affecting zone-plate frequency response and transition quality. To up-sample an image, process 50 of FIG. 3 moves to step 64. For cases where the angular frequency is between zero and $\pi$, a single sine wave may be fitted to the four sample points to interpolate between the inner two points. However, this approach is expensive. A less costly alternative is to use asymmetric FIR differentiating filters in accordance with the present invention. Two such filters preferably used are as follows:

$$filt0=-(3/2)f_{-1}+f_0+f_1-(1/2)f_2$$

$$filt1=(1/2)f_{-1}-f_0-f_1+(3/2)f_2 \quad (5)$$

These filters represent a compromise between their anti-symmetric response and their symmetric response. An anti-symmetric response has good edge accuracy while a symmetric response has good peak accuracy. Because the human eye is more discerning of edge accuracy than peak accuracy, the filters are designed to produce a better anti-symmetric edge response while sacrificing some of the symmetric peak response.

Once the outputs of the filters at step 64 have been determined, process 50 moves to step-66 where the ratio of step 54, equation (2), is again examined. If the ratio is between −1 and +3, the outputs of filters filt0 and filt1 are unemphasized at step 68. Because up-sampling typically sharpens an image, the filter outputs from step 64, equation (5), are each attenuated by 5/8 to obtain an accurate unemphasized differentiating response for the single sine wave case. Unemphasizing an image does not change the sharpness of the image. The new unemphasized gradients are:

$$gr0=(5/8)filt0$$

$$gr1=(5/8)filt1 \quad (6)$$

The frequency response of the unemphasized filter outputs provides a near ideal differentiating response. However, if the ratio is less than −1, the four sample points do not represent a single sine wave, but a multi-sine wave. Because the multiple adjacent edges of a multi-sine wave can cause ringing artifacts, an image is preferably emphasized (i.e., sharpened) to make the desired transition more prominent. An emphasized image is unattenuated. At step 69, the filter outputs from step 64, equation (5), become the emphasized gradients as follows:

$$gr0=filt0$$

$$gr1=filt1 \quad (7)$$

Emphasizing and unemphasizing filter outputs filt0 and filt1 preferably result in images that appear very much like the original image.

The use of short asymmetric FIR filters in up-sampling results in better image resizing than the more conventional anti-symmetric differentiating filters. The asymmetric filters provide good edge and extended-frequency responses with narrow peak sharpening characteristics. By emphasizing accurate edge handling where gradients are steepest and by sacrificing some spectral performance on peaks where, gradients are shallowest, improved zone-plate test signal results are obtained. Resized images are of high quality when viewed by the human eye.

Turning back to FIG. 1, upon calculation of gradients, algorithm 10 moves to step 20 and step 22 to calculate the cubic model coefficients and the re-sampled output values, respectively. To resample the image once the sample data and co-sited gradients are found, piece-wise continuous models of the signal are preferably generated independently along each axis. The piece-wise cubic model may be obtained as follows:

$$f(\Delta p) = \sum_{i=0}^{3} C_i (\Delta p)^i \quad (8)$$

where $0 \leq \Delta p \leq 1$. The coefficients $C_i$ may be found as follows:

$k = f1 - f0$ $C_3 = gr1 + gr0 - 2k$ $C_2 = k - C_3 - gr0$ $C_1 = gr0$ $C_0 = f0 \quad (9)$ where f0 and f1 are the original two inner input samples surrounding the output sample, and gr0 and gr1 are their corresponding co-sited gradients.

Lastly, at step 24, gamma restoration undoes the gamma modification of step 14, restoring the original gamma. The resulting image is suitable for display on a monitor. Algorithm 10 ends at step 26.

Testing of up-sampled images using resizer algorithm 10 have shown re-sampled images to be as sharp as or sharper than those obtained from advanced commercial software packages that have the option of using more sample support. While performance on zone-plate test signals near the Nyquist limit may be weak compared to other image resizing software, this has little bearing on visual quality in general.

Thus it is seen that an economical approach to detection and suppression of ringing artifacts and improved image sharpening when up-sampling is provided. One skilled in the art will appreciate that the present invention can be practiced by other than the described embodiments, which are presented for purposes of illustration and not of limitation, and the present invention is limited only by the claims which follow.

I claim:

1. Apparatus for suppressing ringing artifacts during digital resizing of an image, said apparatus comprising a processor operative to:
   calculate a first difference between two inner of four adjacent image samples;
   calculate a second difference between two outer of said four samples;
   correct said first and second differences by inverting the sign of said first and second differences when said first difference is negative;
   triple said first corrected difference;
   compare said second corrected difference with said tripled first corrected difference; and
   suppress ringing artifacts between said two inner samples using a linear interpolation model when said second corrected difference is greater than said tripled first corrected difference.

2. The apparatus of claim 1 wherein said processor is further operative to suppress ringing artifacts between said two inner samples using a linear interpolation model when said first difference is zero.

3. The apparatus of claim 1 wherein said processor is operative to suppress ringing artifacts independently in each axis in a two dimensional image.

4. The apparatus of claim 1 wherein said processor is further operative to use an interpolation model with an emphasized frequency response characteristic with said two inner samples when said second corrected difference is less than the negative of said first corrected difference.

5. The apparatus of claim 4 wherein said interpolation model comprises cubic polynomial models.

6. The apparatus of claim 1 wherein said processor operative to suppress ringing artifacts is operative to:
   set a first gradient equal to said first difference;
   set a second gradient equal to said first difference; and
   use said first and second gradients to generate a continuous signal model of an image being resized.

7. Apparatus for detecting ringing artifacts during digital resizing of an image, said apparatus comprising a processor operative to:
   calculate a first difference between two inner of four adjacent image samples;
   calculate a second difference between two outer of said four samples;
   compare said first difference with zero;
   triple said first difference; and
   compare said second difference with said tripled first difference, wherein:
      said ringing artifacts are detected when either said first difference equals zero or said second difference is greater than said tripled first difference.

8. The apparatus of claim 7 wherein said processor is further operative to suppress said ringing artifacts between said two inner samples using a linear interpolation model when said ringing artifacts are detected.

9. The apparatus of claim 8 wherein said processor is operative to suppress ringing artifacts independently in each axis in a two dimensional image.

10. The apparatus of claim 8 wherein said processor is further operative to use an interpolation model with an emphasized frequency response characteristic with said two inner samples when said second corrected difference is less than the negative of said first corrected difference.

11. The apparatus of claim 10 wherein said interpolation model comprises cubic polynomial models.

12. The apparatus of claim 8 wherein said processor operative to suppress said ringing artifacts is operative to:
   set a first gradient equal to said first difference;
   set a second gradient equal to said first difference; and use said first and second gradients to generate a continuous signal model of an image being resized.

13. Apparatus for suppressing ringing artifacts during digital image resizing, said apparatus comprising a processor operative to:
- calculate a difference between two inner of four adjacent image samples;
- set a first gradient equal to said difference;
- set a second gradient equal to said difference; and
- suppress ringing artifacts using said first and second gradients to generate a continuous signal model of an image being resized.

14. The apparatus of claim 13 wherein said first and second gradients are used to calculate coefficients of said continuous signal model.

* * * * *